United States Patent [19]

Tuohey et al.

[11] Patent Number: 5,445,731
[45] Date of Patent: Aug. 29, 1995

[54] PERVAPORATION VESSEL

[75] Inventors: David Tuohey, New Hamburg; Craig R. Bartels, Wappingers Falls; Vatsal M. Shah, Fishkill, all of N.Y.

[73] Assignee: Texaco Inc., White Plains, N.Y.

[21] Appl. No.: 117,812

[22] Filed: Sep. 8, 1993

[51] Int. Cl.$^6$ .................. B01D 3/10; B01D 63/04
[52] U.S. Cl. .................. 202/173; 202/200; 202/205; 159/DIG. 27; 159/DIG. 28; 203/39; 203/DIG. 16; 210/149; 210/180; 210/181; 210/186; 210/321.64; 210/321.87; 210/321.9; 210/640
[58] Field of Search .............. 210/640, 180, 181, 184, 210/186, 321.64, 321.87, 321.9, 149; 202/182, 205, 173, 200; 203/39, DIG. 16, 91, 14; 159/DIG. 27, DIG. 28

[56] References Cited

U.S. PATENT DOCUMENTS

| | | | |
|---|---|---|---|
| 4,046,685 | 9/1977 | Bray | 210/321.64 |
| 4,293,419 | 10/1981 | Sekino et al. | 210/321.1 |
| 4,652,373 | 3/1987 | Trimmer | 210/321.87 |
| 4,962,270 | 10/1990 | Feimer et al. | 210/640 |
| 5,158,581 | 10/1992 | Coplan | 210/321.9 |
| 5,294,345 | 3/1994 | Kaschemekat | 210/640 |

FOREIGN PATENT DOCUMENTS

| | | | |
|---|---|---|---|
| 88109268 | 12/1988 | European Pat. Off. | B01D 13/00 |
| 090305577 | 5/1990 | European Pat. Off. | C07C 7/144 |

Primary Examiner—Wilbur Bascomb, Jr.
Attorney, Agent, or Firm—George J. Darsa

[57] ABSTRACT

Apparatus for breaking or separating a liquid mixture or emulsion having two or more components. The apparatus includes a closed vessel having one or more sequentially connected filtering compartments holding a filtering element such as a membrane assembly capable of achieving a multi-stage pervaporation to separate out a vaporous component of the solution. The apparatus further includes a bypass facility which interconnects adjacent filtering compartments. To compensate for the loss of heat energy during the vaporization segments, the residual liquid solution is bypassed into a second vaporization phase, the bypass facility including heating means for maintaining the residual solution of a predetermined liquid temperature prior to its entering the second or subsequent filtering phase.

11 Claims, 2 Drawing Sheets

PERVAPORATION VESSEL

BACKGROUND OF THE INVENTION

Field of the Invention

Processes for the separation of liquids or emulsions into components, have rapidly advanced through the development of more sophisticated techniques and equipment. In one of the more advanced practices, liquids, emulsions and solutions are separable into individual components with a high degree of purity when subjected to a pervaporation process prompted by the utilization of membrane separation techniques.

To most effectively utilize this technology, it is found desirable and productively effective to maintain substantially uniform separating conditions throughout the process. Such control is deemed relevant in the instance of separations embodying pervaporation, particularly during consecutive steps or phases.

It is known, for example, that by forcing the subject liquid or solution through consecutive membrane separation steps causing removal of the vaporized permeate, the residual liquid or liquid mixture can be substantially free of the permeate segment.

It is, therefore, a primary object of the invention to provide an apparatus for the pervaporation of a solution or emulsion to achieve a high degree of accuracy and production efficiency in the removal of at least one of the vaporizable segments of the solution.

SUMMARY OF THE INVENTION

Toward achieving the object of the invention, there is presently provided a pervaporation vessel adapted for pervaporation of an organic aqueous liquid under preferred operating condition.

The apparatus or vessel is comprised primarily of a closed casing into which inlet and discharge ports are formed and into which a barrier wall is positioned to define a plurality of, and at least two adjacent filtering compartments.

A pervaporation element in the form of a membrane assembly is positioned in each filter compartment for contacting hot aqueous or organic fluid and vaporized permeate which passes through the respective compartments. The membrane assembly is structured to pass only the vaporized permeate and block the residual liquid.

At least one bypass means external to the vessel receives residual liquid which is substantially free of the vaporized component. Heating means in said bypass means restores the liquid to its operating temperature prior to reintroducing it into an adjacent filter compartment for the next nanofiltration of the treatment.

One method for utilizing the apparatus comprises the multi-stage processing of a liquid solution to separate a vaporizable component from the solution by providing a closed vessel having a plurality of filter compartments, each compartment containing a nanofiltering element, establishing a reduced operating pressure within the vessel, introducing the liquid solution into one of the filter compartments, the solution being at an elevated temperature at which the vaporizable component will vaporize when in the presence of the reduced operating pressure in said vessel, conducting residual liquid from said first filter compartment into a second of said plurality of filter compartments by way of a bypass system, heating the solution in said bypass system to said elevated temperature, and withdrawing from the vessel those vapors which have passed through said nanofiltering elements.

DESCRIPTION OF THE INVENTION

Figure 1:
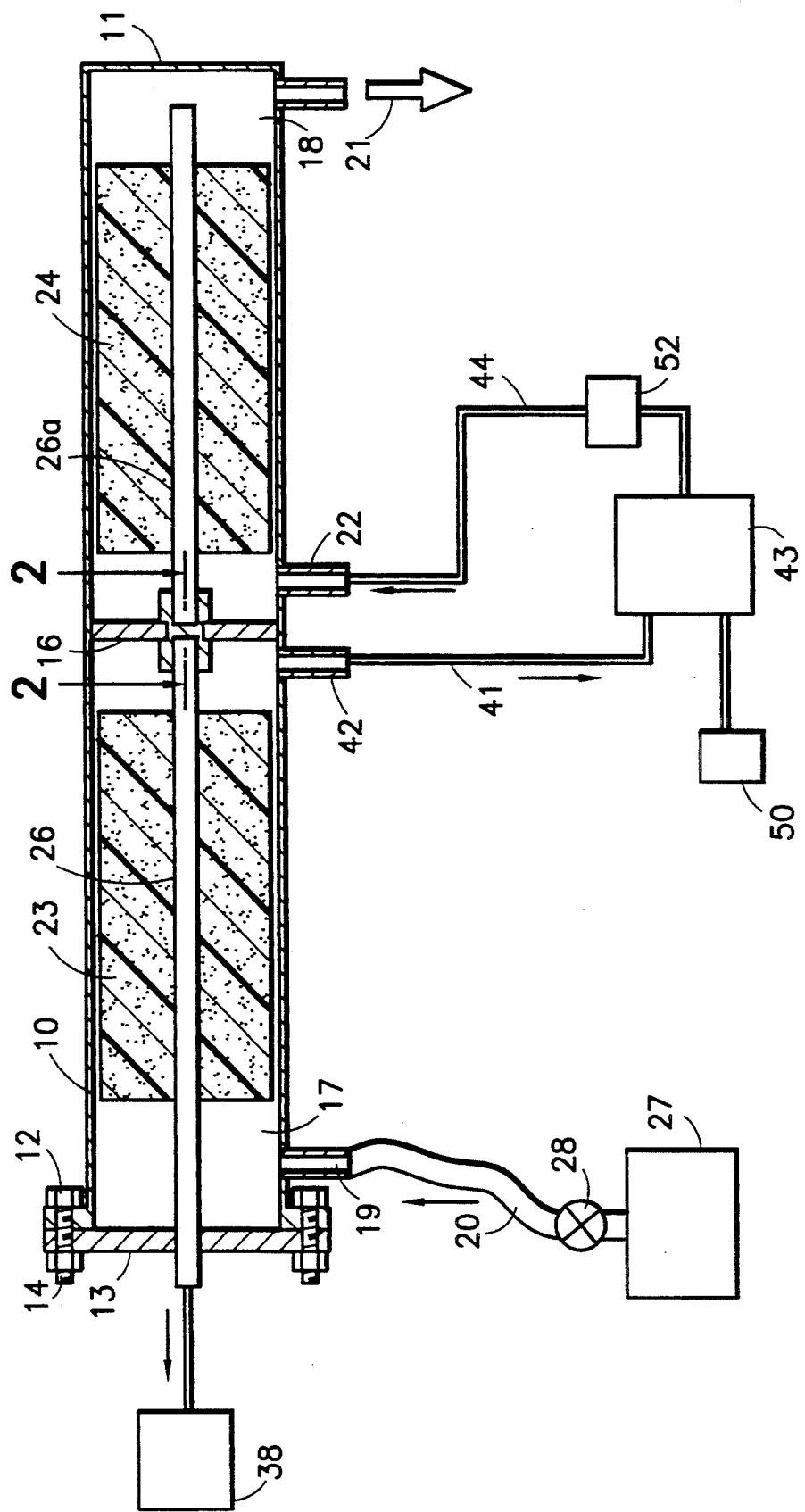
FIG. 1 of the drawing represents a cross-sectioned elevation view of the vessel contemplated.

Referring to FIG. 1, a vessel 10 or casing of the type contemplated is shown, into which a hot aqueous or solvent solution is introduced and subject to a pervaporation process as a result of the vaporization of one of the solutions' components. The vaporized segment of the solution is removed at a reduced pressure by way of a permeate tube which carries the separated portion of the solution to a subsequent treating step. The residual liquid can then be drained from the vessel.

Structurally, vessel 10 is comprised primarily of an elongated tubular or cylindrical member formed of steel or of a comparable metal adequate to sustain the operating conditions of a pervaporation procedure. To illustrate the instant apparatus in view of its function, i.e., separation of a vaporizable component from an aqueous organic solution, the instant separation will be deemed to be at a preferred pressure of about 5-60 psi and an operating temperature of about 80° to 125° C.

The cylindrical vessel 10 can be provided at opposite ends with closure means. Preferably, one end is provided with a fixed wall 11. The other end includes a flange 12 or similar connector to which a gasket and cover plate 13 removably attached by a series of bolts 14 or equivalent fastenings.

The inner surface of elongated tubular vessel 10 is provided with substantially smooth walls to facilitate positioning of one or more internal baffle plates or separating panels 16 within the vessel. At least one such internal baffle plate is located to divide the vessel into two separate though contiguous filter compartments 17 & 18. The number of said compartments, which can be formed into a vessel, and the size of the latter, are variable factors depending on the physical character of the solution to be separated and the volume of liquid to be handled.

First filter compartment 17 includes an inlet port 19 having suitable fittings to accommodate a conduit 20 carrying heated untreated emulsion or untreated solution. The contiguous or next filter compartment 18 is provided with an outlet 21 which is spaced from baffle plate 16 to allow for draining or removal of residual product after the final vaporization step.

The downstream or second filter compartment 18 is substantially identical to the first filter compartment 17, having an inlet 22 positioned immediately adjacent to the baffle plate 16. Each filtering compartment 17 and 18 as noted, is provided with a filtering membrane or filtering assembly capable of achieving the physical pervaporation of a vaporizable component from the solution. This step is prompted through facility of membrane assemblies 23 and 24 which are positioned in each of the respective filtering compartments to sequentially treat solution passing through the compartment.

The function of the membrane assembly presently contemplated and utilizable in the practice of the solution separating process herein disclosed, embodies passing the solution from a first heat source or heat exchanger 27 where it is adjusted to the process' preferred operating temperature. The heated solution is then introduced at a controlled rate by valve 28 to the first or initial filter compartment 17 in which a reduced pressure is maintained to sustain the vaporized segment. Pervaporation or separation of the vaporizable segment of the liquid can then be achieved by the composite membrane structure 23.

The membrane assemblies 23 and 24 are particularly designed to separate a particular solution. Structurally, however, in one embodiment, they can include basically a carrier layer which provides necessary mechanical strength, a porous support layer, and a separating layer or membrane across which the pervaporation occurs. Thereafter, vapor is withdrawn through permeate tube 26. Residual being at a reduced temperature will then be removed from compartment 17 for reheating.

The membrane assembly carrier layer when such is used, is characterized by its high degree of porosity and mechanical strength. Simultaneously, it can be fibrous or non-fibrous, woven or non-woven. In a preferred embodiment, the carrier layer can be a porous, flexible non-woven fibrous polyester. A form of porous support layer useful in the membrane can be preferably formed of a sheet of polysulfone polymer. Said membrane, in its final configuration, is shaped into a cylindrical member or envelope having a central supporting rod or tube or tubes 26 and 26a which serve the further function of carrying off permeate vapors.

Figure 2:
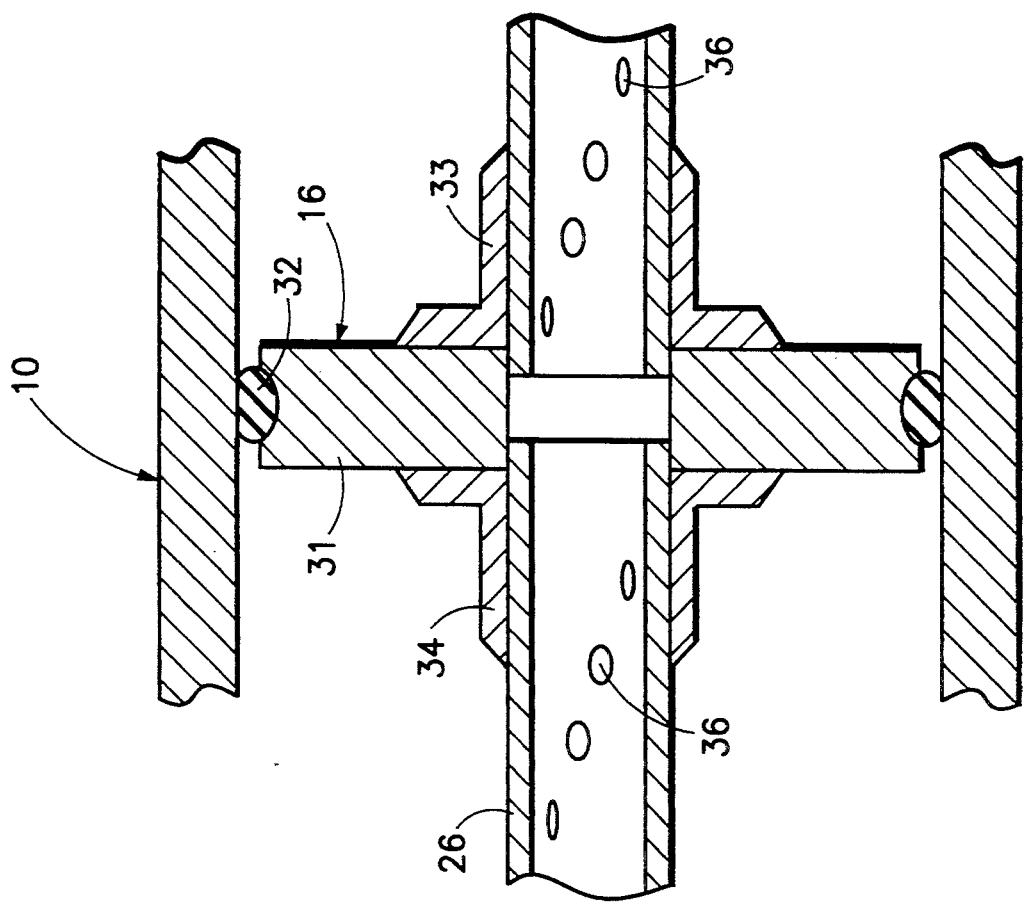
FIG. 2 is a cross-sectional view taken along line 2-1 in FIG. 1.

Referring to FIG. 2, internally, vessel 10 is provided with at least one compartment forming baffle plate or panel 16, to form a plurality of separate filter compartments and multiple filtering members 23 and 24. In one embodiment, baffle plate 16 comprises primarily a disk-like member 31 formed of metal or a suitable non-metallic material capable of resisting deterioration within the atmosphere of vessel 10.

The periphery of said disk-like member 31 is provided with a deformable sealing ring 32, which in its compressed condition, will effectively separate the interior of the vessel 10, dividing 14 into two contiguous filtering compartments 17 and 18. Said barrier includes a central opening around which connecting collar 33 and 34 are provided on opposite faces of the disk.

The permeate tube which extends substantially the length of vessel 10, is fitted into one or both of said collars 33 and 34 to support the respective downstream and upstream filter element 23 and 24. In the instance of a single elongated permeate tube, the latter extends through the panel 16 into which it is fastened. Said permeate tube is sealably engaged with flange 12 of the removable closure plate 13 to avoid the loss of the reduced pressure atmosphere which is established within vessel 10 during the separation process.

The permeate tube 26 and 26a (when two tubes are used) are provided with a series of openings 36 spaced longitudinally thereof and enclosed by a filter element through which permeate vapors are drawn by maintaining a reduced pressure within vessel 10. Tube 26 can be attached at its external end to a vacuum source, or pump 38, equipped for creating the reduced pressure atmosphere and for receiving separated vapors which pass through the filtering units.

The pressure drop realized within vessel 10 by the temperature and vaporization process in compartment 17 will result in a lowering of the temperature of residual liquid which remains in said compartment. This temperature reduction as noted, mandates the necessity for further heating of the residual liquid if the vaporization is to be continued at a desired production rate.

A barrier wall bypass means through which the partially reduced or residual fluid is passed between the sequential separation steps or stages, is comprised primarily of a conduit 41 which connects directly to the discharge outlet 42 of the first filtering compartment 17. Outward flowing residual liquid, after the first pervaporization step, is passed through a heater or a heat exchanger 43 which can embody a heating medium or electrically powered heat coils.

Said heater 43 is thermally controlled by temperature control means (50) to regulate the transfer of heat into the passing residual liquid such that the latter can be reintroduced by way of a downstream conductor 44 to inlet 22 of second filtering compartment 18. In the latter, the elevated or revived temperature of the liquid will cause an additional vaporizable segment to be vaporized out and passed into the permeate tube so long as a reduced atmosphere is maintained in compartment 18 by vacuum source 38.

Subsequent to the second pervaporation step, the residual liquid leaving outlet 21 will be presumed to be free or substantially free of the vaporizable or aqueous segment which has been withdrawn from vessel 10 and into the vacuum source 38. The now remaining liquid product will be discharged through port 21 for further processing as may be required.

Should the required degree of solution separation necessitate additional pervaporation, vessel 10 can be provided with additional filter compartments which would embody similar liquid bypass means.

The liquid bypass system can be provided with a pumping element (52) preferably connected downstream of heater element 43 for the purpose of urging reheated residual liquid into second stage filter compartment 18.

It is understood that although modifications and variations of the invention can be made without departing from the spirit and scope thereof, only such limitations should be imposed as are indicated in the appended claims.

What is claimed is:

1. Apparatus for the pervaporation of an organic aqueous liquid having at least one vaporizable component, which includes a vessel, liquid inlet and outlet as well as a vapor outlet means communicated with said vessel, at least one baffle plate assembly in said vessel defining a plurality of filter compartments, a pervaporation member in each of said plurality of filter compartments for contacting said organic aqueous liquid, and for passing only the vaporizable component therethrough, bypass means communicating said plurality of filtering compartments for conducting residual liquid sequentially therethrough, heat exchange means associated with said bypass means for regulating the temperature of residual liquid therein and, vacuum means communicated with said respective filter compartments for maintaining a reduced pressure therein whereby to evacuate said vaporizable component from said vessel.

2. In the apparatus as defined in claim 1, wherein said bypass means is positioned externally to said vessel and includes opposed ends communicated with adjacently positioned filter compartments.

3. In the apparatus as defined in claim 1 wherein said heat exchange means includes an electrically activated heating unit associated with said bypass means.

4. In the apparatus as defined in claim 3, wherein said electrically activated heating unit includes temperature control means.

5. In the apparatus as defined in claim 1, wherein said bypass means communicating said plurality of filter compartments include means for pumping residual liquid sequentially therethrough.

6. In the apparatus as defined in claim 1, wherein said at least one baffle plate assembly is positioned to define a plurality of adjacently positioned filter compartments, and includes a peripheral seal for engaging an inner wall of said vessel.

7. In the apparatus as defined in claim 1, wherein said vacuum means communicated with the respective filter compartments includes a conduit extending through said vessel, opening into each of said filter compartments, for communication with an external reduced pressure source to withdraw vapors from said vessel.

8. In the apparatus as defined in claim 1, wherein said vessel is comprised of an elongated cylindrical member, and said at least one baffle plate assembly is disposed normal to the longitudinal axis of said elongated cylindrical member whereby to define said filter compartments.

9. In the apparatus as defined in claim 8, wherein said elongated cylindrical vessel includes an outlet for discharging hot aqueous liquid at one end thereof, and an inlet means at the other end for receiving hot organic aqueous liquid.

10. In the apparatus as defined in claim 1, including at least one permeate tube, extending longitudinally within said vessel, and each permeate tube being communicated with a filter compartment, and with said vacuum means.

11. The apparatus as defined in claim 1, wherein the vessel is comprised of an elongated cylindrical member, and more than one baffle plate assembly in the vessel defining a plurality of filter compartments, where the baffle plate assemblies are disposed normal to the longitudinal axis of the elongated cylindrical member to define the filter compartments.

* * * * *